F. BERNSEE.
Horse Trappings.
No. 147,471. Patented Feb. 17, 1874.
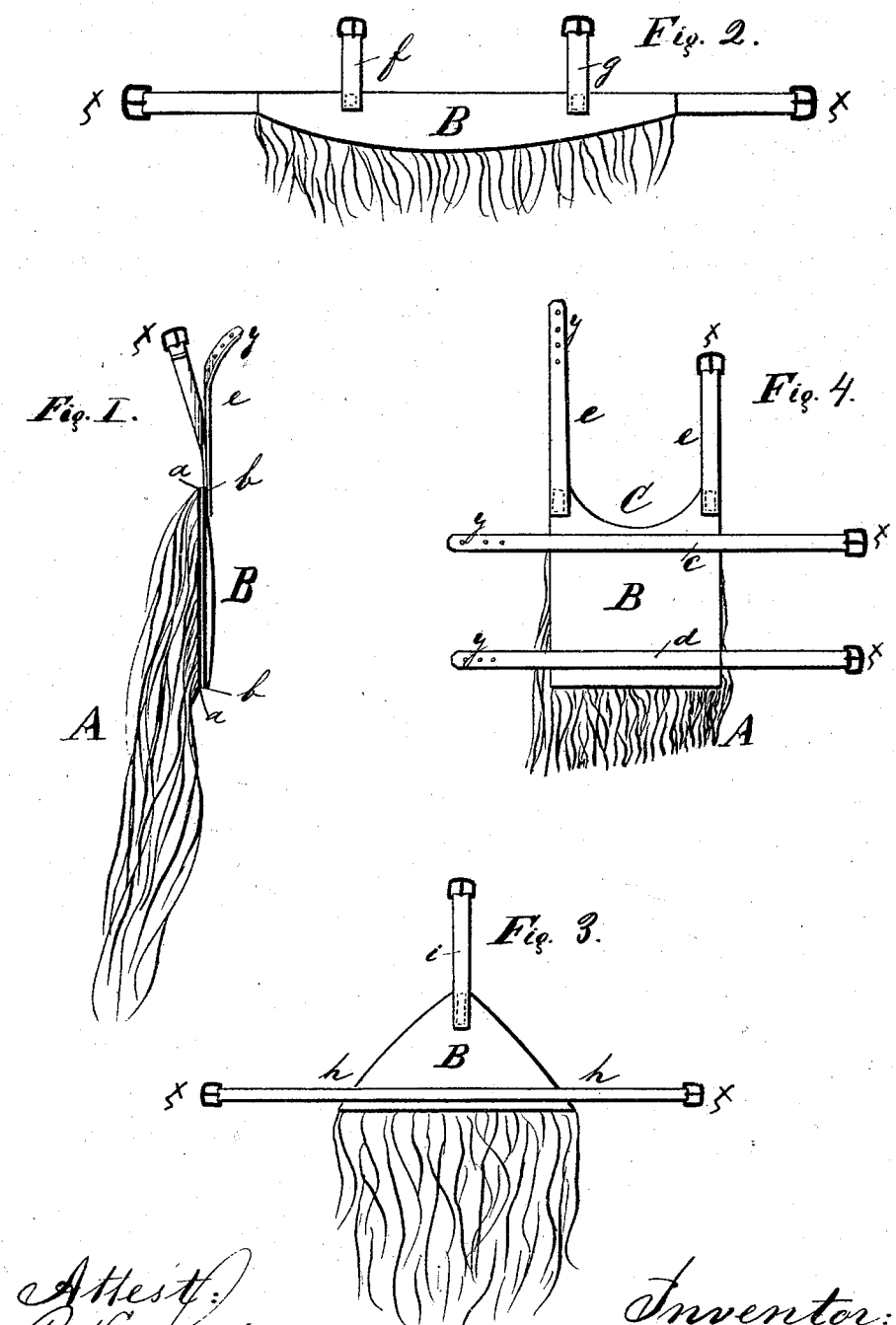

UNITED STATES PATENT OFFICE.

FREDERICK BERNSEE, OF BROOKLYN, NEW YORK.

IMPROVEMENT IN HORSE-TRAPPINGS.

Specification forming part of Letters Patent No. 147,471, dated February 17, 1874; application filed September 1, 1873.

*To all whom it may concern:*

Be it known that I, FREDERICK BERNSEE, of Brooklyn, in the county of Kings and State of New York, have invented certain new and useful Improvements in Horse-Trappings; and I do hereby declare the following to be a full, clear, and exact description of the invention, such as will enable others skilled in the art to which it pertains to make and use it, reference being had to the accompanying drawings, which form part of this specification.

My invention has for its object to improve the appearance of horses of all grades by the employment of a set of trappings consisting of an artificial tail, mane, and top-knot. It is generally conceded that nothing adds more to the beauty and attractiveness of a fine animal than a long and rich tail, a flowing mane, and a handsome top-knot; yet even fine horses are often without these desirable adjuncts, the possession of which would greatly add to their looks and appearance.

To remedy this natural defect, I have invented certain appendages or horse-trappings, which consist, respectively, of, first, an artificial horse-tail; second, an artificial horse-mane; and, third, an artificial top-knot, the three together forming a full set for the equipment of a horse, while at the same time, of course, each may be used separately and independently of the others.

On the sheet of drawings hereto annexed, Figure 1 represents an artificial horse-tail, side view. Fig. 2 represents an artificial horse-mane, back view. Fig. 3 represents an artificial top-knot for horses; and Fig. 4 represents the upper portion or "pillow" of an artificial horse-tail, showing also one of the methods by which the said tail may be attached to the real tail of the animal.

Similar letters of reference indicate corresponding parts in all the figures.

In Fig. 1, which is a side view, A is the tail proper, which may be made of horse-hair, jute, hemp, or any other suitable material, and may be dyed or colored, so as to be of any shade called for, and correspond exactly with the color of the real tail of the animal to which it is to be applied. B is a bolster or pillow, formed by a square piece of leather, $a$, or any other suitable material, indented at the top, into which the hairs or other material forming the tail are inserted through holes, and, by knots in the ends of them, prevented from slipping out again, in the usual manner for making perukes or periwigs, &c. This piece of leather, holding the hairs, is covered by another corresponding piece of leather, $h$, Fig. 1, and the two pieces forming the pillow $a$ and $b$ are stitched together all around the edges. The space between $a$ and $b$ may be stuffed or padded with any suitable material, if found desirable, or the piece $b$ may be made in the shape of a pad of india-rubber. $c$ and $d$ are two straps, stitched across the piece $b$ at the top and bottom, and provided with the buckles $x$, and tongue-holes $y$, or equivalent fastenings. $e$ is another, longer strap, which is designed to go up through the crupper back again, and buckled at $x$. This strap will prevent the tail from sliding down, as otherwise it might when it is placed in position with the straps $c$ and $d$ strapped around the tail of the animal. In applying the tail, it is pushed well up under the hairs of the real tail, which will thus cover the pillow and the straps, buckles, &c., by means of which it is attached and kept in place. The opening or indenture C permits the artificial tail to be pushed up to the root of the animal's own tail, so that the artificial appendage will partake of all the natural movements of the posterior appendage furnished by nature.

The mane, Fig. 2, and top-knot, Fig. 3, are constructed in substantially the same manner as the tail already described, the shape and arrangement of buckles, fastenings, &c., only varying to suit the requirements of the positions in which they are to be placed. Like the tail, the mane, when used, is laid well up under the real mane, where its top will not be seen, and fastened at both ends to the harness, by means of the buckles $x$, or their equivalent. By making the hair or other material of which the mane is made of sufficient length, it will hang below the hair of the real mane, with which, of course, it can be made to correspond exactly in contour and color. If it should hang too low in the middle, or be bulging downward, one or two rubber straps, or equivalent attachments, shown at $f$ and $g$, may be employed, for the purpose of keeping it in the desired position, by fastening the said straps to the skin or hair near the root of the real mane of the animal. One or two rubber suction-cups may be used with advantage for this purpose in place of the straps $f$ and $g$.

The top-knot does not differ in construction from the mane or tail. It is provided with the straps $h$ and $i$, the former being provided with buckles $x$, or equivalent fastenings, by means of which it is attached to the horse-gear. The top strap $i$ goes up between the horse's ears, where it is fastened to the top of the bridle. This top strap prevents the knot from falling down, while the strap $h$ prevents it from sliding or moving sidewise, thus keeping it immovably in place. It is made the full width of the horse's forehead, and may be plaited or not, to suit the requirements of taste and fashion.

Having thus described the object, scope, and character of my invention, I desire it to be understood that I do not confine myself to the precise details herein specified, with regard to the shapes and construction of my artificial horse-tail, mane, or top-knot. Instead of leather, rubber, or any other suitable material, may be employed in the construction of the pillow, straps, &c.; and the fastenings, or modes of attachment, may be of any suitable kind. Likewise, as already stated, hair, jute, hemp, or any other suitable material may be used in the construction of a set of trappings. If the hairs used in making the artificial tail, mane, or top-knot, should be too short, or if a great length of these appendages is required, the tails, manes, or top-knots may be made in sections, by a series of tails, &c., connected together by means of straps, or in any other suitable manner, so as to make the tail, mane, or top-knot of any desired length; but

I claim as new and desire to secure by Letters Patent—

As a new article of manufacture, the herein-described set of ornamental trappings for horses or other animals, consisting of an artificial tail, mane, and foretop, singly or severally, provided with the straps $c\ d, f\ g$, and $h\ i$, and buckles $x$, or their equivalent, when constructed substantially as and for the purpose set forth.

In testimony that I claim the foregoing I have hereunto set my hand this 28th day of August, 1873.

FREDERICK BERNSEE.

Witnesses:
 FRANK WILLIAMS,
 FRANCIS P. BURKE.